United States Patent
Fafet et al.

[11] Patent Number: 5,931,152
[45] Date of Patent: Aug. 3, 1999

[54] GLASS-CERAMIC COOKING PLATE FOR GAS COOKERS, AND METHOD FOR MAKING SAME

[75] Inventors: Gerald P. Fafet, Carrieres Sur Seine; Allan M. Fredholm, Mennecy, both of France

[73] Assignee: Eurokera, Chateau Thierry, France

[21] Appl. No.: 08/973,181

[22] PCT Filed: Jun. 17, 1996

[86] PCT No.: PCT/FR96/00927

§ 371 Date: Dec. 5, 1997

§ 102(e) Date: Dec. 5, 1997

[87] PCT Pub. No.: WO97/00407

PCT Pub. Date: Jan. 3, 1997

[30] Foreign Application Priority Data

Jun. 19, 1995 [FR] France .................................. 95 07296

[51] Int. Cl.⁶ .................................................. F24C 15/10
[52] U.S. Cl. .................................. 126/214 R; 126/39 R; 126/214 A

[58] Field of Search ................................ 126/211, 214 R, 126/215, 214 A, 216, 39 R

[56] References Cited

U.S. PATENT DOCUMENTS

| | | | |
|---|---|---|---|
| 4,458,661 | 7/1984 | Mulay | 126/39 M |
| 4,835,121 | 5/1989 | Shibuya et al. | 501/4 |
| 5,212,122 | 5/1993 | Pannhorst et al. | 501/69 |
| 5,313,929 | 5/1994 | Thurk et al. | 126/39 R |
| 5,549,100 | 8/1996 | Heisher et al. | 126/214 R |

FOREIGN PATENT DOCUMENTS

0615096 A1  9/1994  European Pat. Off. .

*Primary Examiner*—Carroll B. Dority
*Attorney, Agent, or Firm*—Angela N. Nwaneri

[57] ABSTRACT

The invention relates to a glass-ceramic cooking plate for gas cooking apparatuses, characterized by the fact that it has at least one opening 2 intended to receive a gas burner 3 and several humps 5 of the same height distributed around this opening which are intended to support a cooking utensil which is to be heated by said burner, said humps being an integral part of the plate itself.

15 Claims, 2 Drawing Sheets

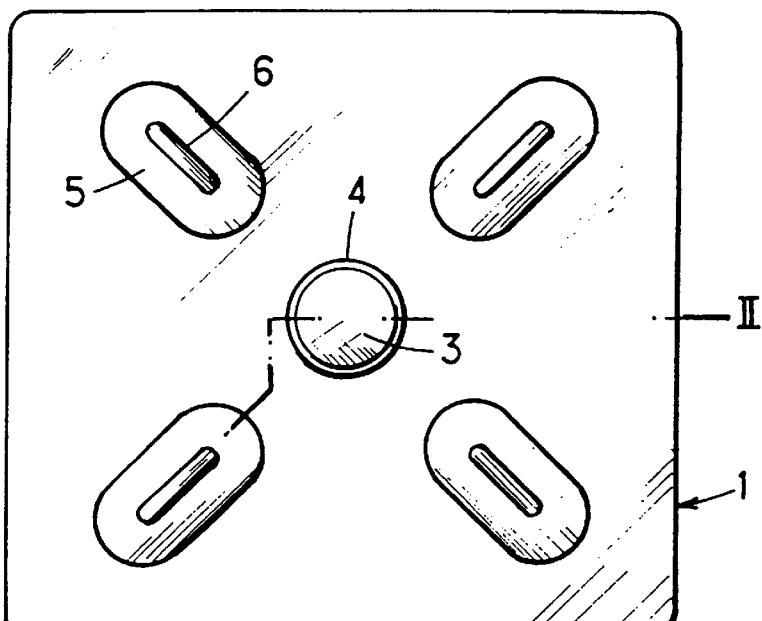
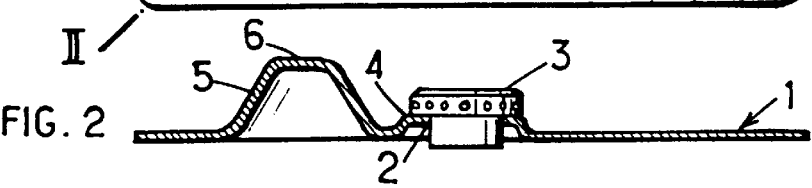
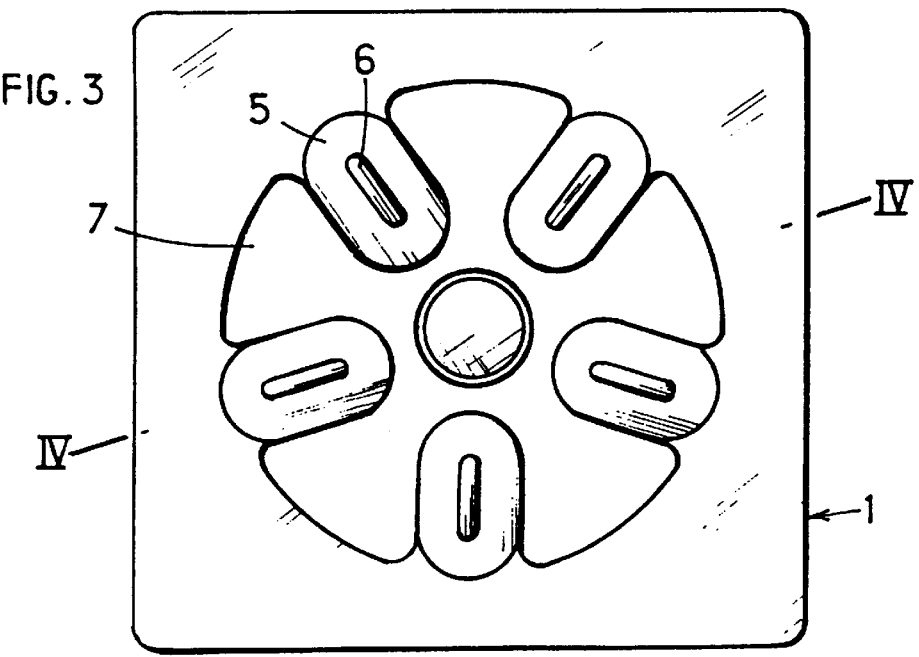
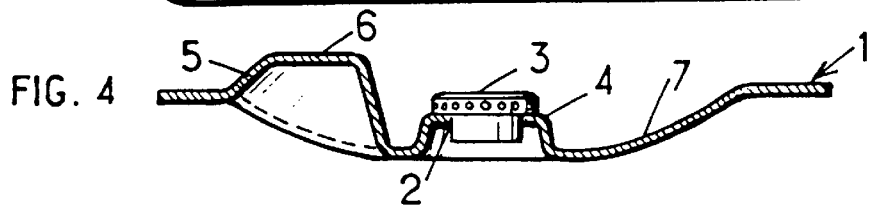

GLASS-CERAMIC COOKING PLATE FOR GAS COOKERS, AND METHOD FOR MAKING SAME

The invention relates to a glass-ceramic gas cooking plate and to a process for manufacturing it.

The market of cooking plates which can be fixed in or which are integrated in kitchen ranges includes essentially three types of products: gas flame plates, electric plates made of cast iron, and glass-ceramic plates.

The gas flame cooking plates consist of a plate, generally made of enamelled sheet metal, of burners emerging from this plate, and of supports for cooking articles resting on this plate.

Recent efforts have renewed the appearance of these cooking plates by replacement of the traditional enamelled sheet metal by glass or glass-ceramic plates. However, these innovations have not modified the old design of the gas flame plate which includes a plate, burners, and supports for the cooking utensils.

The electric plates made of cast iron have allowed electrical energy to be used for cooking, but since the advent of glass-ceramic cooking plates, they have been confined to bottom-of-the-line electric cooking plates.

The glass-ceramic cooking plates occupy a predominant place in the market of cooking plates and represent modernity and the top of the line with regard to cast iron electric plates and the gas flame plates. The qualities recognized by consumers are ease of cleaning due to the continuity of the glass-ceramic plate as well as the modern appearance of these surfaces, which are black in color in almost all cases. The glass-ceramic plates use several systems of heating. Heating by radiant or halogen electric ranges is the most widespread, but requires several kilowatts of power, which are not always available on the electrical networks of a number of countries including Italy and to a lesser extent Spain. For these countries, systems of heating with gas with no visible flame, placed under the glass-ceramic plate, have been developed in order to replace electric ranges.

Heating of cooking articles using flameless gas ranges or radiant or halogen electric ranges, because the transfer of heat to said articles occurs through the glass-ceramic plate, involves preheating of the plate. Systems of heating by induction under the glass-ceramic plate allow one to heat the cooking utensil directly without heating the glass-ceramic plate, but they require specific cooking articles (which are conductive and preferably magnetic).

The use of lithium aluminosilicate glass-ceramics has allowed for the development of glass-ceramic cooking plates due to their very low expansion coefficient which allows them to resist thermal shocks of several hundred degrees.

Let us recall that a glass-ceramic is originally a glass, called precursor glass, whose specific chemical composition makes it possible to bring about a controlled crystallization by suitable thermal treatments called ceramic processing treatments. This specific structure which is partly crystallized gives the glass-ceramic unique properties. During ceramic processing treatments, the following phases are generally observed: a nucleation phase during which the nuclei on which the crystals will form coalesce, and a crystallization phase during which the crystals form and then grow. The viscosity of the glass decreases during the initial heating, has a minimum value just before crystallization, and then increases under the effect of crystallization. Nucleation takes place at around 700° C. Ceramic processing into transparent material occurs at around 900° C., whereas ceramic processing into opaque material takes place at around 1100° C., with opalizing beginning at around 1000° C.

Various material belonging to the family of the lithium aluminosilicate glass-ceramics are used as support for cooking articles: β-quartz glass-ceramics, black in appearance, slightly transparent in the visible, and to varying degrees transparent in the infrared, and β-spodumene glass-ceramics, white in appearance, opaque in the visible, and slightly transparent in the infrared. Because of their optical properties, the use of β-spodumene glass-ceramics is only associated with induction heating, but more and more, induction plates are using black glass-ceramic plates for aesthetic reasons. The thickness of the glass-ceramic plates is generally approximately 4 mm except in the case of certain professional applications in which case the thickness can be increased to 5 or 6 mm. Other colors or optical appearances can be produced using glass-ceramic with different compositions or which have undergone various treatments.

In order to combine the respective advantages of the gas flame cooking plates and the glass-ceramic gas cooking plates, it would be desirable to be able to manufacture molded glass-ceramic plates whose shapes would integrate the function of support for the cooking articles and the function of passage of the burner. The availability of such plates would make it possible to remedy the respective disadvantages of the currently known gas flame cooking plates and the glass-ceramic gas cooking plates, disadvantages of which are connected to the fact that molded glass-ceramic plates are not currently available.

Thus, currently, only cooking with gas flames allows for variations of power which allow one to heat very rapidly but also to stop heating very rapidly. In effect, the flameless gas burners placed under a glass-ceramic plate offer the disadvantages of heating inertia and above all, slow cooling, because of the need to heat the glass-ceramic plate. Measurements have shown that after use, the temperature of a plate returns to 50° C. after approximately 40 min. This lack of flexibility can be a problem for users accustomed to the heating flexibility of gas flames. The main disadvantage of the gas flame plates is their old-fashioned appearance in connection with the use of enamelled sheet metal which makes them seem like bottom-of-the-line products.

As much as the cleaning of the glass-ceramic cooking plates is an asset generally mentioned at the top of the list by a great majority of consumers, it is tedious to disassemble the grates of the gas flame cooking plates in order to clean them and to clean the enamelled sheet metal plate. Improved gas cooking plates are therefore needed.

The invention aims to meet this need by providing molded glass-ceramic plates which integrate the function of support for the cooking utensils and which make it possible to combine the respective advantages of gas flame cooking plates (rapidity of heating and instantaneous cutoff of the heating of the cooking articles) and of the glass-ceramic cooking plates (easy cleaning, aesthetic) while eliminating the grates for supporting the cooking articles on the traditional gas plates.

More precisely, the invention relates to a glass-ceramic cooking plate for gas cooking apparatuses, characterized by the fact that it has at least one opening intended to receive a gas burner, and several humps of the same height distributed around this opening and which are intended to support a cooking utensil which is to be heated by said burner, said humps being an integral part of the plate itself.

Advantageously, said opening is at a higher level than the part of the plate which is contiguous with it.

According to a preferred embodiment, the plate also has a zone which is depressed with respect to said opening and to the edges of the plate, which is provided around said opening and intended to collect accidental liquid overflows during cooking.

The height of the humps must be sufficient so that the bottoms of the cooking utensils (sauce pans, frying pans, stew pans, etc.), placed on these humps are approximately 1–3 cm above the top of the burner positioned in the corresponding opening.

The tops of the humps are preferably flat and horizontal.

A cooking plate according to the invention can have a single burner opening, but it can also have two or more of them, depending on the desired number of burners per plate.

The invention also relates to gas cooking apparatuses (for example, kitchen ranges and cooking plates which can be fit in) which have a plate according to the invention.

The invention also includes cooking apparatuses which have a single plate with one burner or with multiple burners (conventional configuration), as well as apparatuses which have two or more plates, each of these plates having a single burner or multiple burners. The term "burner" is understood to mean a cooking site.

The invention also relates to mixed cooking apparatuses in which the cooking plate(s) would have both gas burners and radiant, halogen, or induction burners.

A cooking apparatus with several removable single-burner plates is particularly advantageous, allowing them to be cleaned easily, for example in a dishwasher or in a pyrolysis furnace, because of their reduced unit size, in comparison with a three- or four-burner plate with much larger dimensions.

The glass-ceramic cooking plates cannot be manufactured directly from a flat plate made of glass-ceramic because in order to form the humps of the cooking plate, it would be necessary to curve the glass-ceramic plate according to small radii of curvature, typically on the order of a centimeter, which one does not currently know how to do.

One does know how to deform glass-ceramic plates by high temperature pressing. However, the change of the viscosity of the lithium aluminosilicate glass-ceramics during the ceramic processing cycle only allows one to form the glass-ceramic plates by pressing with large radii of curvature, typically greater than 10 cm. The production of clearly smaller radii of curvature on glass-ceramic plates, for example, on the order of a centimeter, is not possible by the pressing process, since the minimum viscosity reached just before ceramic processing is too high. This process is therefore not suitable for producing a cooking plate according to the invention.

A known process allowing one to produce glass pieces with deep humps, consists of heating sheets of glass cut to suitable dimensions beyond the softening temperature of the glass and then shaping them by pressing and/or by suction.

However, this process cannot be applied to glass-ceramic pieces of complex shape, because the heating phase would lead to uncontrolled ceramic processing of the pieces and therefore to at least one of the following disadvantages:

shaping impossible or incomplete because of early ceramic processing considerably increasing the viscosity of the piece;

breaking of the pieces after formation of zones with different degrees of ceramic processing.

Another process which can be considered would be to produce these pieces by pressing of a drop of glass (called a gob) in a tool assembly which has a cavity defining the exterior contours of the piece.

Such an operation is not easy given:

the extreme deformation which the glass drop must undergo during the shaping, and all the more so if the desired product is thin;

the risk of trapping air in the complex parts of the cavity of the tool and therefore of generating molding defects;

contact of the gob with the mold before pressing creates marks called curls which are damaging to the aesthetic appearance of the pieces.

The precursor glasses of glass-ceramics are characterized, in the vitreous state, by an extremely short work threshold. This means that the time during which the glass remains pasty and can therefore be shaped in a molding operation is extremely short.

This characteristic therefore does not allow one to obtain the type of piece desired by pressing of a drop of precursor glass, except when considering very thick pieces (6–8 mm) whose weights are therefore incompatible.

The invention therefore aims to provide a process which allows one to produce glass-ceramic plates with humps according to the invention.

The process of the present invention offers none of the above disadvantages. Moreover, it allows for economical production because it allows for high production speeds with relatively simple equipment.

The process of the invention includes the following steps:

I) shaping of a sheet of glass in the pasty state, whose width is greater than the width of the cooking plate to be formed and whose viscosity is 1,000–50,000 Pa•s, from a mass of melted precursor glass-ceramic glass by rolling of said melted glass between rollers;

II) delivering said sheet of pasty glass to the molding surface of a mold provided with some means of suction in such a way that it covers said molding surface, this molding surface having the impression of a number of humps;

III) laying the sheet against the molding surface of the mold sucking in said sheet with said means of suction;

IV) trimming and/or cutting the parts of the sheet exceeding the molding surface of the mold in such a way as to obtain a molded precursor glass plate; and V) subjecting the molded glass plate to a thermal ceramic processing treatment in order to convert it into a glass-ceramic plate.

Besides the aforementioned steps, the process of the invention can include various optional steps as will emerge from the description hereafter given in reference to the appended drawings.

In the drawings

FIG. 1 is a top view of a single-burner cooking plate according to the invention;

FIG. 2 is a view in cross section according to line II—II of FIG. 1;

FIG. 3 is a top view of another single-burner cooking plate according to the invention; and FIG. 4 is a view in cross section according to line IV—IV of FIG. 3.

Figure 5:
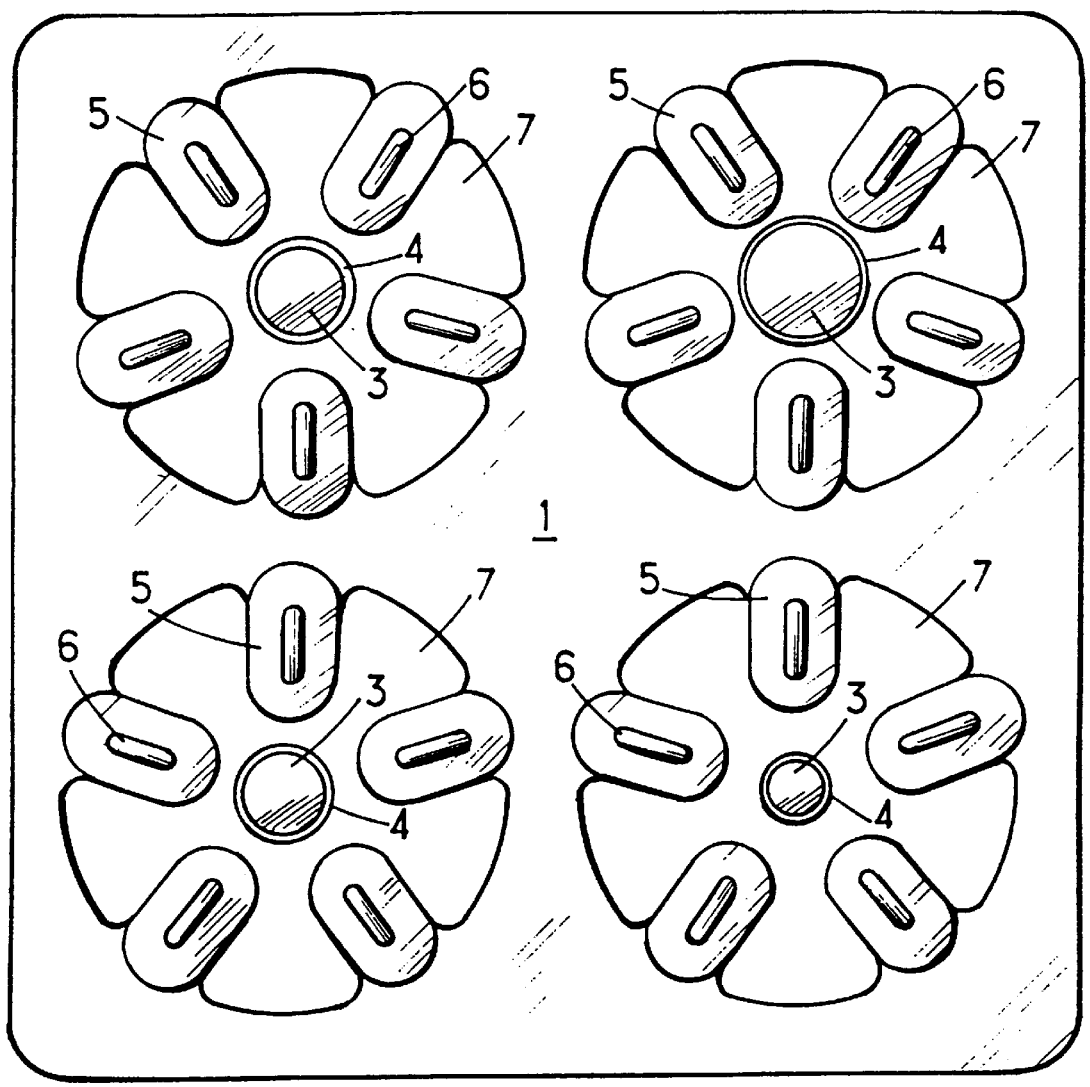
FIG. 5 is a top view of a multiple-burner cooking plate according to the invention.

In FIGS. 1 and 2, a glass-ceramic cooking plate according to the invention is represented.

This plate, designated by general reference 1, has circular opening 2, intended to receive gas burner 3 of conventional type, which is at a level slightly higher than that of the rest of the plate, neck 4 making a transition between the opening and the rest of the plate in order to reduce the risk of flow of a liquid accidentally spread over the plate, between the edge of the opening and the burner. The plate also has four humps 5 made by molding, which are distributed around the opening and intended to support the cooking utensil whose contents is to be heated by the burner housed in opening 2. Each of these humps has a height of approximately 25 mm and has flat surface 6 at its top.

FIGS. 3 and 4 represent an improved version of the plate of FIGS. 1 and 2. According to this variant, depression 7 with, from the top, the general shape of a five-leaf clover, is formed in the plate around opening 2 and between humps 5, five of which are provided in this case. The function of this depression is to collect any liquid coming from accidental overflow or spilling in order to prevent it from flowing between the edge of the opening and the burner.

Finally, FIG. 5 shows a four-burner cooking plate according to the invention, the burners having a configur-ation similar to that shown in FIGS. 3 and 4, except that they each have an opening 2 of variable diameter so as to receive burners of different power.

The plates of FIGS. 1–5 can be manufactured as follows:

According to the present process, one begins by molding a glass-ceramic precursor glass sheet whose width is greater than the width of the piece to be molded, in the pasty state, with a viscosity between 1,000–50,000 Pa•s and preferably between 2,000–25,000 Pa•s.

Such a sheet can be obtained by rolling between two rollers in a continuous or discontinuous manner.

According to the continuous mode, a system for delivering liquid glass is placed near the two cylinders. Its end generally has a slit through which the glass flows and arrives between two rollers which are driven in rotation. Such a device is generally vertical, which allows one to obtain a small thickness of delivered glass (less than 60 mm and preferably less than 40 mm), and therefore a reduced wetting angle of the rollers in order to limit the cooling of the glass while ensuring the passage of a high flow rate of glass.

As a variant, it is possible to operate discontinuously. In such a variant, the rollers are periodically supplied with glass gobs; the length of the gob is roughly equal to the width of the sheet which is desired. The gobs can be formed by a well-known conventional delivery system provided with shears. The gobs can be distributed directly on the rollers or by an intermediary gob guide.

In both cases, the viscosity of the glass brought to the rollers will not be very high: less than 1,000 Pa•s and preferably less than 500 Pa•s.

The rollers can have an exterior diameter between 60–140 mm and will generally be drilled in order to allow for the incorporation of a cooling system. A variety of materials making it up can be considered, among which are tool steels, stainless steels, nickel and cobalt alloys, or one of these materials provided with a metallic or ceramic covering. By this choice, as well as by adjustment of the exterior temperature of the rollers, it is possible to vary the surface state and the viscosity of the glass sheet.

The next step of the process consists of running a mold under the rollers and of depositing the glass sheet on the molding surface of this mold. The running speed of the mold is advantageously greater than that of the running of the sheet in order to prevent the formation of folds. This mold is provided with some means to produce suction of the glass sheet, which allows one to lay the glass sheet against the upper wall of the mold. The molding surface of the mold has impressions corresponding to the humps of the cooking plate to be manufactured. These impressions can be in raised or hollowed form.

The value of this method of molding is that it requires much less deformation of the glass than pressing of a drop of glass, for the glass to become formed to the desired shape, and that the deformation occurs before contact with a tool, and therefore without violent cooling (and therefore solidification). Thin plates ($\leq 4$ mm, for example) with deep humps ($\geq 25$ mm) can be obtained easily.

The plate roughs thus formed do not yet have their final shape at this stage. For the continuous variant, the roughs are still part of the same strip. In both cases, they do not have their final exterior dimensions, and their opening has not yet been produced.

Even though the minimum operation to be carried out with heat consists of disjoining the plate roughs in the continuous variant, with it possible to do the rest of the operations cold by well-known finishing techniques (tracing-breaking, sawing, coring, grinding), for the sake of economy, it is generally preferable to produce the final shape with heat, with it possible nevertheless to do certain finishing operations cold.

The means of cutting which are considered are the following.

Using a tool with a sharp edge, it is possible to disjoin the glass sheet or to greatly thin it so that a mechanical or thermal shock is sufficient to cause it to break. Such tools can be used to delimit the exterior contours of the piece, eliminating the excess glass in the case of the discontinuous variant, and disjoining the pieces of the glass sheet in the continuous variant. They can also be used to form holes inside the piece, for example, in its central part. Depending on the case, these means of cutting can be used, during, or after the suction. U.S. Pat. No. 3,193,367 and U.S. Pat. No. 3,582,454 describe means of trimming molded glass articles under vacuum and can be consulted for more detail.

Though molding by suction constitutes the main means for molding the plate, it is however possible to add a pressing operation to this. This can be the case if certain parts of the plate must have zones on their upper surface which are dimensionally very precise or which have particular details. In this case again, this pressing operation will be done in the wisest way possible with respect to the cutting and suction operations.

A process of molding by pressing a sheet of glass in the melted state and trimming of the molded sheet which is obtained is described in U.S. Pat. No. 4,361,429, to which one can refer for more details. Also, devices for continuous molding of a sheet of glass which are similar to those described in U.S. Pat. No. 3,114,620 (conveyor device) or U.S. Pat. No. 3,231,356 (rotating device) can be used.

After the cutting operation, the plates are discharged from the mold.

An operation of burning the cut edges by conventional methods of flame polishing can then be carried out before conveying towards an annealing installation or directly towards the thermal ceramic processing treatment.

After annealing, the plates with humps can be decorated with the enamels ordinarily deposited by a silk-screen process or by a transfer process on the glass-ceramic cooking plates. Given the humps, these enamels will preferably be deposited by a transfer process.

After having produced the humps by the molding operations described above, and possibly the deposition of the enamels, it is possible to directly ceramize the precursor glass plate with humps by subjecting it to a ceramic processing treatment which typically includes the following steps:

a) raising of the temperature of the glass plate at a rate of 10–100° C./min up to the range of nucleation of the glass, b) passage through the interval of nucleation of the glass in a time period generally between 10 min and 1 hr;

c) raising of the temperature up to the temperature of ceramic processing in a time period generally between 10 min and 1 hr;

d) maintaining of the temperature of ceramic processing generally for 15 min to 1 hr, and e) rapid cooling of the glass-ceramic plate to room temperature.

As a variant, it is possible to anneal, and then to cool the precursor glass plate in a conventional manner if one prefers to perform the ceramic processing later.

One of the advantageous characteristics of the process of the invention is that it is possible to obtain a superior surface condition of the piece, close to fire polish.

By preparing the rollers in a suitable manner, it is also possible to give this surface a controlled roughness or to produce patterns (checkered, friezes, . . . ) on all or part of this surface, which considerably broadens the palette of possible products.

Likewise, by hollowing the exterior surface of at least one of the rollers at certain places, it is possible to control the thickness profile of the plate, for example, in order to intentionally make certain zones thicker or in order to compensate for the natural thinning of the parts which will be the most deformed during molding.

The molds can be produced in different ways:

out of materials such as bronze, stainless steel, or graphite, provided with empty passages for the production of a depression. The passages can be small perforations or can be larger holes in which a porous material has been introduced;

made of porous materials such as bronze, stainless steel, or graphite of low density, with suction being created through the mass of the material.

In all cases, these molds will be provided with some means allowing their temperature to be checked.

As an illustration, an example of execution of a cooking plate according to the invention will be given hereafter, whose finished dimensions are 280 mm×280 mm×4 mm.

A precursor glass with the following composition in wt % based on the oxides:

$SiO_2$: 68.25
$Al_2O_3$: 19.2
$Li_2O$: 3.5
$MgO$: 1.2
$ZnO$: 1.6
$BaO$: 0.8
$TiO_2$: 2.6
$ZrO_2$: 1.7
$As_3O_4$: 0.6
$Na_2O+K_2O$: 0.35
$V_2O_5$: 0.2 are melted and rolled into a continuous sheet 320 mm wide between two rollers with exterior diameter 100 mm and which are given a linear speed of 8.5 mm/min; the viscosity of the glass before rolling is approximately 300 Pa•s and after rolling approximately 5,000 Pa•s. The precursor glass sheet is applied by suction on the molds of a continuous machine with 20 molds mounted on a conveyor. In this case, the speed of running of the 20 molds placed on the machine is 12.5 m/min corresponding to a rate of 39 pieces/min for a load of glass of 56 tons/day. The glass sheet with humps, with a length lightly greater than 280 mm long, is separated hot by tracing and braking of the strip of glass and then finished by the usual techniques for cutting and shaping to the dimensions of 280 mm×280 mm.

The plate thus formed is then placed on a ceramic processing support made of refractory material and is ceramized according to the following ceramic processing treatment:

raising of the temperature from room temperature to 620° C. in 30 min, passage through the interval of nucleation from 620° C. to 760° C. in 45 min, raising of the temperature up to the temperature of ceramic processing of 900° C. in 45 min, maintaining the temperature of ceramic processing of 900° C. for 30 min, and cooling from 900° C. to room temperature in 10 min.

It goes without saying that the embodiments described are only examples and that they could be modified, particularly by substitution of technical equivalents, without consequently leaving the scope of the invention.

We claim:

1. A glass-ceramic cooking plate for a gas cooking apparatus, characterized by the fact that said plate has at least one cooking site comprising: a neck region defining an opening, and a plurality of humps of the same height distributed around said opening, said humps being an integral part of the plate.

2. A cooking plate according to claim 1, characterized by the fact that said neck region is at a higher level than the part of the plate with which it is contiguous.

3. A cooking plate according to claim 1 or 2, further characterized by the fact that the plate further comprises a zone 7 surrounding the neck region, said zone being depressed with respect to said neck region.

4. A cooking plate according to claim 1, characterized by the fact that the tops of the humps are flat and horizontal.

5. A process for production of a glass-ceramic cooking plate having at least one cooking site according to claim 1, characterized by the fact that it includes the following steps:

a) shaping a mass of melted precursor glass to form a sheet of glass while said glass is in a pasty state;

b) delivering said sheet of pasty glass to a mold having a surface defining the impression of said cooking site, said mold further comprising suction means;

c) using said suction means laying the sheet against the surface of the mold in such a way that the sheet covers the surface of the mold;

d) trimming any parts of the sheet exceeding the surface of the mold in such a way as to obtain a molded precursor glass plate; and e) subjecting the molded precursor glass plate to a thermal ceramic processing treatment in order to convert said glass into a glass-ceramic plate.

6. A process according to claim 5, further comprising the step of pressing the precursor glass sheet.

7. A glass-ceramic cooking plate according to claim 1, characterized by the fact that said plate comprises lithium aluminosilicate material.

8. A glass-ceramic cooking plate according to claim 7, characterized by the fact that the material is selected from the group consisting of beta-quartz, and beta-spodumene.

9. A glass-ceramic cooking plate according to claim 1, characterized by the fact that said plate is transparent.

10. A glass-ceramic cooking plate according to claim 1, characterized by the fact that said plate is opaque.

11. A process according to claim 5, wherein during the shaping step, the glass is characterized by having a viscosity in the range of 1,000–50,000 Pa.s.

12. A process according to claim 5, wherein said sheet is formed by rolling the melted mass of precursor glass between two rollers.

13. A process according to claim 12, characterized by the fact that at least one of the rollers has a surface whose texture is selected from the group consisting of, a rough surface, a surface with a pattern, and a hollowed surface.

14. A process according to claim 13, characterized by the fact that the mold comprises a porous material such that suction can be created through the entire mold surface.

15. A process according to claim 5, characterized by the fact that said mold further comprises temperature control means.

* * * * *